March 13, 1951     B. D. HABER     2,544,673
ELECTRICAL METHOD OF ADHESIVE BOND TESTING
Filed Jan. 16, 1948
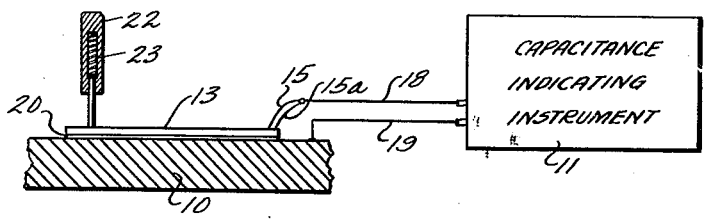
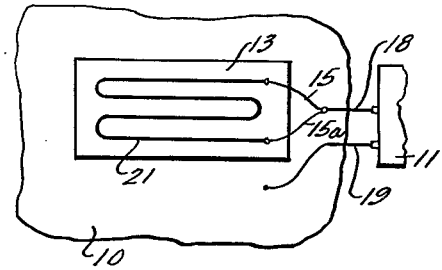
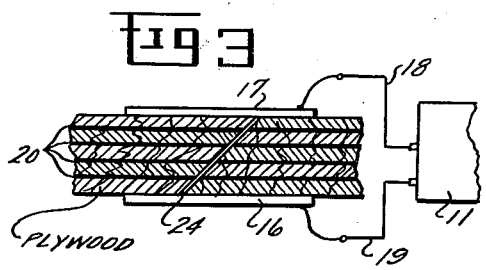
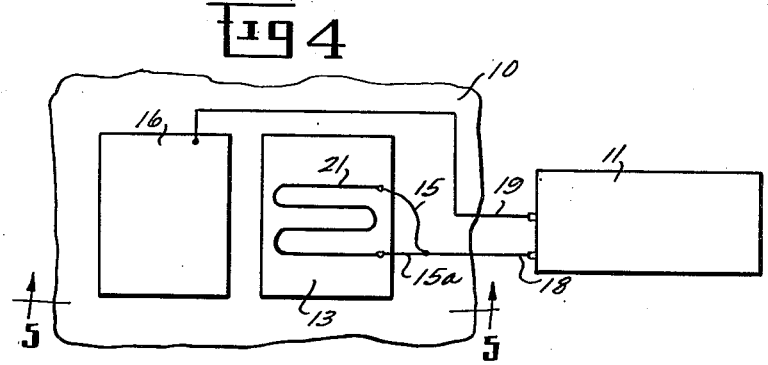
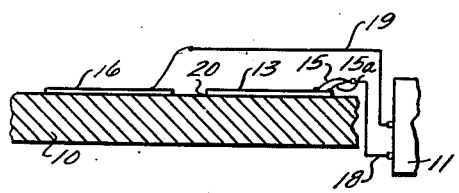
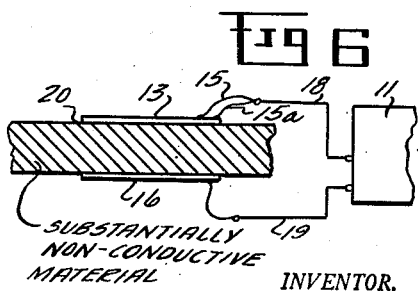
INVENTOR.
BERNARD D. HABER
BY Wade Koonty and Chester Tietig
ATTORNEYS Patented Mar. 13, 1951

2,544,673

UNITED STATES PATENT OFFICE 2,544,673

ELECTRICAL METHOD OF ADHESIVE BOND TESTING

Bernard D. Haber, Montgomery County, Ohio

Application January 16, 1948, Serial No. 2,793

7 Claims. (Cl. 175—183)

(Granted under the act of March 3, 1883, as amended April 30, 1928; 370 O. G. 757)

The invention described herein may be manufactured and used by or for the Government for governmental purposes without payment to me of any royalty thereon.

This invention relates to a method of non-destructive testing of adhesive bonds. More particularly it relates to an electrical method for testing whether the bond of cement which attaches wire strain gauges to the structures in which strains are to be measured, is satisfactory. Another application of the method is in testing the bond between the sheets of plywood.

One object of the invention is, therefore, to provide a convenient and non-destructive method of testing adhesive bonds. Other objects will be hereinafter apparent to those skilled in the art.

My method necessitates the use of an instrument which indicates minute changes in capacitance, such as a capacitance bridge. Such apparatus is well known and various forms thereof are shown in the following patents:

| | |
|---|---|
| Allen | 1,781,153 |
| Allen | 1,824,745 |
| Eyer | 2,043,241 |
| Howe | 2,076,944 |
| Crist | 2,297,346 |

For the practice of my method, such form of the capacitance measuring apparatus may be selected as may be deemed most convenient and accurate.

When an electrical resistance type wire strain gauge is cemented to the structure to be tested, the bond between the gauge and the structure must be perfect if the results are to be trusted. In the case of a metal structure, the bond is therefore checked according to the present invention as follows: The strain gauge and the metal structure are each separately connected to the capacitance bridge so that they will form the plates of a condenser. The adhesive bond is considered to be the dielectric.

Referring now to the drawings,

Fig. 1 is a diagrammatic showing of the arrangement of the condenser plates on the structure to be tested.

Fig. 2 is a plan view of the condenser plate arrangement shown in Fig. 1.

Fig. 3 is a cross section similar to Fig. 2, showing the arrangement of condenser plates for testing diagonal or scarfed joint.

Fig. 4 is a plan view showing a side-by-side arrangement of a condenser plate and a strain gauge on a fixed structural member.

Fig. 5 is a cross section of Fig. 4 taken on the line 5—5 thereof.

Fig. 6 is a cross section corresponding to Fig. 5 except that the condenser plate is on the bottom of the structural member.

In the figures, 10 is the structure the strength of which is to be ultimately tested; 11 is a capacitance bridge, 13 is an electrical resistance type strain gauge, 20 is the bond between the strain gauge and the structure 10, 15 and 15a are the strain gauge leads and (in Fig. 3) 16 is a lower condenser plate and 17 an upper condenser plate. 18 and 19 are leads connecting condenser plates 16 and 17 respectively of their equivalent to the capacitance bridge 11.

In Fig. 1 for example, 10 may be a metal plate in the floor of a railroad bridge. The strain gauge 13 is cemented by means of an adhesive layer 20 to the upper surface of the floor 10 while both leads 15 and 15a of the strain gauge are connected to a single terminal of the capacitance bridge 11. Lead 19 may be attached to the upper surface of the bridge floor at a small distance from the edge of the strain gauge 13. The approximate disposition of the wire 21 inside the strain gauge 13 is shown in Fig. 2, but this is not critical and may be varied. The composite structure therefore forms an electrical condenser in which the adhesive layer 20 is the dielectric. A satisfactory adhesive is General Radio Corporation, Radio Service cement No. 3032. The capacitance bridge may be a General Radio Corporation, type 716C in combination with a General Radio Precision Variable Capacitor, type 722D. The strain gauge may be a Baldwin-Southwark, type SR4-A1.

In carrying out the method, for example, a current or signal of about 10 KC frequency is applied to the condenser formed between the strain gauge 13, adhesive 20 and structural member 10. The reading in micro-microfarads of capacity is noted. An insulated prod 22 is now pressed on the top surface of strain gauge 13 and the capacity reading is noted while the pressure is applied. No more pressure is used on the prod than is required to fully compress the coil spring 23 in its handle. It will require a known weight to compress the spring. The change in reading of the bond capacitance is then noted. This change is compared with the change in capacitance produced in condensers formed by similar strain gauges, similar cement and metal plates to which the gauges were bonded which were determined to be either properly or improperly bonded by mechanically loading the plates to which the strain gauges were cemented and noting the strain readings of the strain gauges and comparing these strain readings to strain readings obtained by other means. As an example, the following results are given to show values of variation in electrical capacitance indicating satisfactory and unsatisfactory bonds using the gauges and cements above mentioned.

| Specimen | Difference in Capacity | Bond |
|---|---|---|
| | Micromicrofarad | |
| 1 | 0.10 | Good. |
| 2 | 0.075 | Do. |
| 3 | 0.40 | Bad. |
| 4 | 0.35 | Do. |

The exact point of difference between good and bad is selected, in view of the results sought and the accuracy desired.

A preferred shortened method, based on the foregoing procedure, is utilized to indicate the difference in capacitance between the pressed and unpressed adhesive bond directly. In this method the capacitance-measuring-instrument is set at a predetermined reading before the prod 22 is used to apply pressure. This reading may be a permanent instrument setting. The prod 22 is then applied as before and the instrument reading produced by the pressure is noted. This is due to the change in capacitance of the bond and is read directly without calculations.

Fig. 3 shows the method being applied to plywood, which is designated 20. In this method an upper condenser plate 17 and a lower condenser plate 16 are first applied to the wood 20 with only moderate pressure and the reading noted. Heavier predetermined pressure is then applied, preferably with an insulated or non-conducting pressure applicator, say a wood vise. The reading under such pressure is noted and the difference determined. A high difference is the sign of a weak bond.

The strength of a scarfed joint 24 can also be obtained with this method. The scarfed joint in ordinary lumber (not plywood) can most satisfactorily be so tested, but the scarfed joint of plywood can also be tested if the correction to be applied for the change in capacity of the bond between the plies is first ascertained. The calculations involved are simple and will be obvious to experts.

A side-by-side arrangement of condenser plates is the equivalent of the sandwich arrangement shown and described for Figs. 3 and 6. This arrangement is used for testing the bond to conducting materials. The distance between the nearest plate edge influences the condenser capacity. Such an arrangement is shown in Figs. 4 and 5. In this arrangement both leads 15 and 15a of the strain gauge 13 are connected to one lead 18 from the capacitance indicating instrument 11. Readings are made just as in the vertical arrangement of condenser plates.

Fig. 6 shows another arrangement for testing the bonds to substantially non-conducting materials such as plastics, lumber, etc. The strain gauge 13 is adhesively mounted on the top of the material to be tested and a condenser plate 16 mounted directly below the strain gauge 13 without adhesive. One lead 18 connects the strain gauge and another lead 19 connects the lower condenser plate 16 to the capacitance indicating instrument 11. The capacitance of the entire condenser is measured, and the procedure is identical to that which was described above in connection with Fig. 1.

In the case of Fig. 6, a bonded material of say, aluminum and wood may be tested. In such case the aluminum takes the place of the strain gauge 13 and the wood takes the place of the material 10. A lower condenser plate 16 is applied to the material 10 as described and shown.

I claim as my invention:

1. The method of non-destructively testing adhesive bonds which comprises the step of making the bond at least part of the dielectric of an electrical condenser, ascertaining the capacitance of said condenser first substantially without pressure and then with pressure on the plates thereof and determining the difference between the capacitances.

2. The method according to claim 1 in which the bonds of plywood are tested by placing the plywood between condenser plates.

3. The method according to claim 1 in which a scarfed joint cemented with adhesive is placed between the condenser plates.

4. The method according to claim 1 in which plywood having a cemented scarfed joint is placed between the condenser plates and a correction is made for the change in capacity of the bonds between the plies as distinguished from the change in capacity of the scarfed joint.

5. The method according to claim 1 in which the bond of a bonded material of a metal and a substantial non-conductor are to be tested, with the steps of making the metal one plate of an electrical condenser and applying another plate to the substantial non-conductor to make a complete condenser.

6. The method of testing the adherence of an adhesive bond which comprises applying conductive plates to make the bond the dielectric of a condenser, applying high frequency current to the condenser, measuring the electrical capacity of the condenser while the current is applied, first without pressure and then with uniform, predetermined pressure on said condenser plates and on the bond.

7. A method of nondestructively testing adhesive bonds which comprise the steps of making a bond at least part of the dielectric of an electrical condenser, connecting the condenser so made into one arm of a capacitance bridge, ascertaining the capacitance of said condenser first substantially without pressure and then with pressure on the plates thereof and determining the difference between the capacitance values so obtained.

BERNARD D. HABER.

REFERENCES CITED

The following references are of record in the file of this patent:

UNITED STATES PATENTS

| Number | Name | Date |
|---|---|---|
| 1,939,883 | Edwards | Dec. 19, 1933 |
| 1,984,166 | Walter | Dec. 11, 1934 |
| 2,123,812 | Stevens et al. | July 12, 1938 |
| 2,373,846 | Olken | Apr. 17, 1945 |